United States Patent Office 3,145,508
Patented Aug. 25, 1964

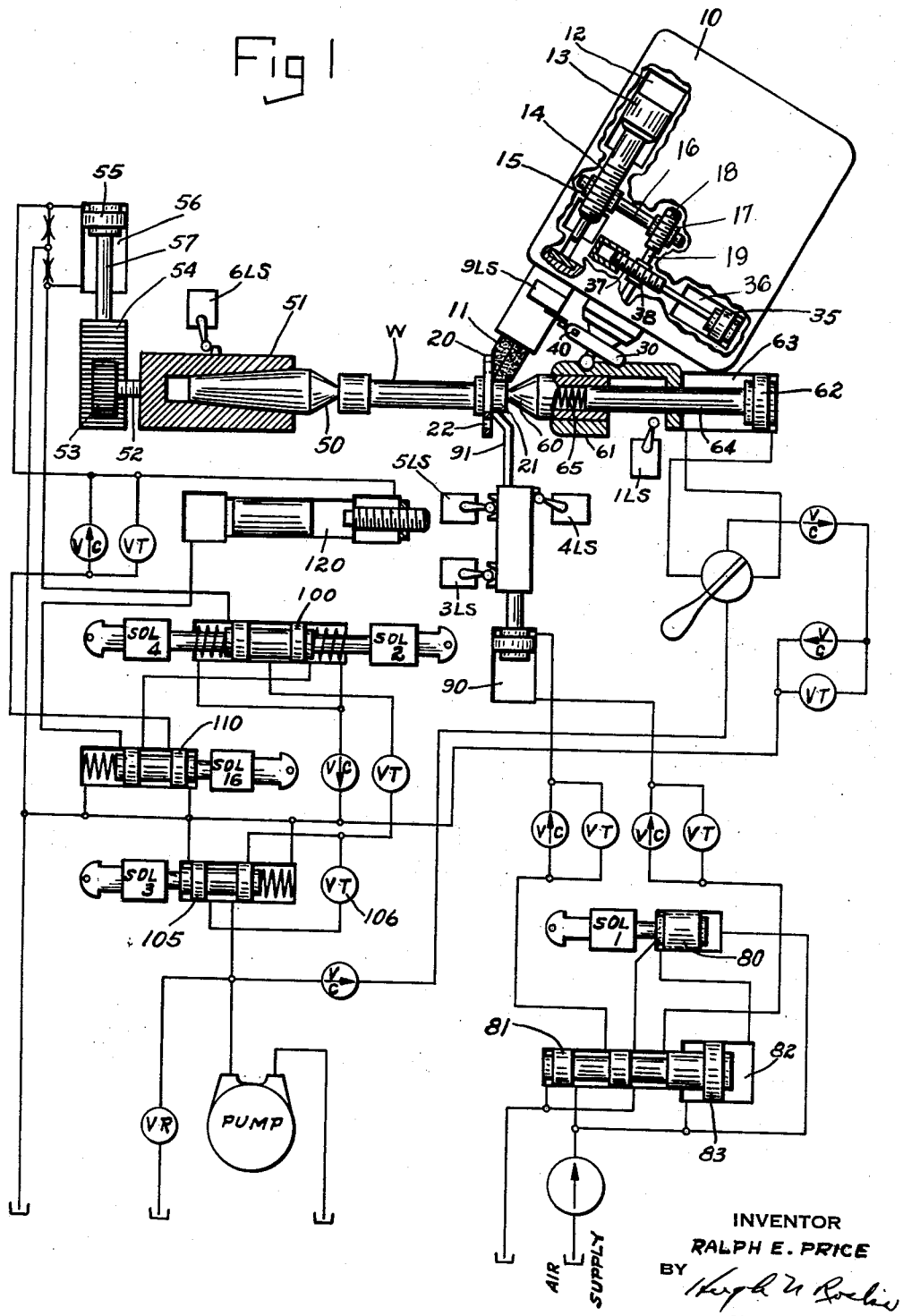

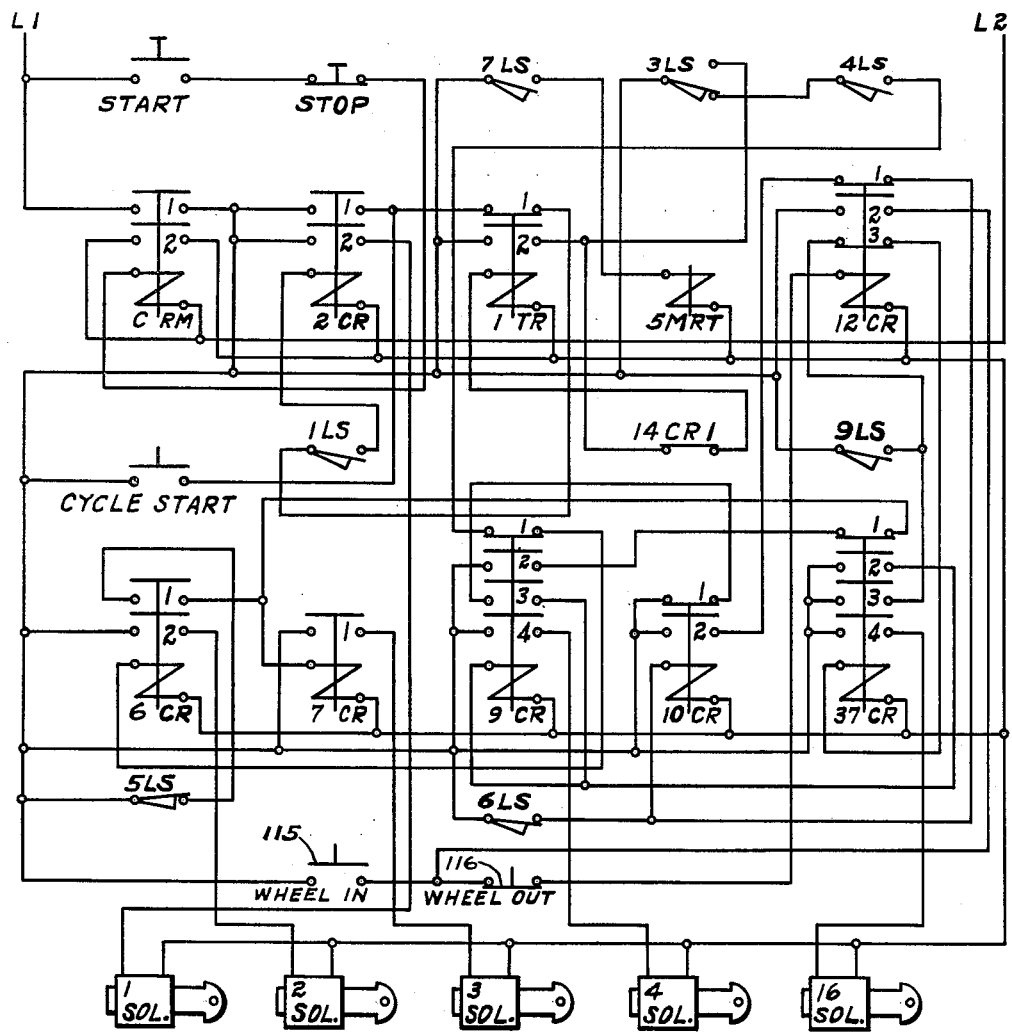

3,145,508
APPARATUS FOR GRINDING INTERSECTING
ANNULAR AND CYLINDRICAL SURFACES
Ralph E. Price, Waynesboro, Pa., assignor to Landis Tool
Company, Waynesboro, Pa.
Filed Feb. 21, 1963, Ser. No. 260,247
4 Claims. (Cl. 51—105)

This invention relates to apparatus for machining adjacent annular and cylindrical portions of a workpiece.

This is a conventional operation for a grinding machine in which the grinding wheel is fed at an angle to the axis of the work and formed to engage said annular and cylindrical portions of a workpiece simultaneously.

The means for effecting axial location of a workpiece relative to the grinding wheel is disclosed in U.S. Patent 3,064,395, granted November 20, 1962. This consists of hydraulic means to rotate a screw to shift the headstock center, the workpiece, and the footstock center to place said workpiece in operative relation to the grinding wheel. A locating device in the path of the annular face of said workpiece stops the endwise movement of the centers when the work reaches operative position.

It has been found desirable in many cases to continue grinding the cylindrical portion of the workpiece after the annular portion of the workpiece is completed.

It is, therefore, an object of the present invention to grind the annular and cylindrical portions of a workpiece simultaneously to a predetermined point after which the work or wheel is shifted to separate the annular portion from the grinding wheel while continuing the grinding operation on the cylindrical portion. This is accomplished by control means operable in conjunction with a wheel feeding means to retract the workpiece axially to stop the grinding operation on the annular portion of the workpiece.

FIG. 1 is a hydraulic circuit showing the elements required for the function of the invention.

FIG. 2 is an electric circuit.

Grinding wheel support 10 is slidably mounted on a bed (not shown) for movement toward and from a workpiece W. In this case, workpiece W has a flange portion 20 and a cylindrical portion 21. Flange or annular portion 20 has a plurality of angularly spaced holes 22.

Grinding wheel 11, rotatably mounted on wheel support 10, is formed to grind both the flange portion 20 and the cylindrical portion 21 at the same time. For wheels of this type, wheel support 10 is mounted at an angle with one face of grinding wheel 11 parallel to the work axis and the other face perpendicular to the work axis.

The means for advancing and retracting wheel support 10 consists of a cylinder 12 in which is mounted a piston 13 for effecting axial movement of feed screw 14. Feed screw 14 is connected through wheel support 10 to worm gear 15 and shaft 16. At the other end of shaft 16, is a worm gear 17 in engagement with worm 18 on hand wheel shaft 19 to which is attached a hand wheel 30.

Hand wheel 30 is connected to shaft 19 by means of a clutch (not shown) so that shaft 19 may also be rotated by feed piston 35 in cylinder 36. Piston 35 is connected to worm 37 in operative engagement with worm gear 38 on shaft 19. Cam 40 on hand wheel 30 is arranged to operate feed slow down limit switch 9LS.

Workpiece W is supported between headstock center 50 and footstock center 60. Center 50 is mounted in a slidable member or quill 51 which may be adjusted axially by means of screw 52. Screw 52 is rotated by pinion 53 in operative engagement with rack 54. Rack 54 is attached to piston 55 in cylinder 56 by means of piston rod 57.

Footstock center 60 is slidably mounted in housing 61 and urged resiliently against a workpiece by piston 62 in cylinder 63 having a piston rod 64 operable through spring 65.

Operation

The machine start switch is closed, energizing relay CRM.

Relay contacts CRM1 and CRM2 close to connect lines L1 and L2 respectively to the circuit.

Footstock center 60 is advanced by shifting a footstock control lever (not shown) to the right to direct fluid under pressure to the head end of footstock cylinder 63.

When footstock center 60 advances, it closes limit switch 1LS.

Closing the cycle start switch completes a circuit through limit switch 1LS to energize lateral locator advance relay 2CR.

Relay contact 2CR1 completes a holding circuit.

Relay contact 2CR2 completes a circuit to energize lateral locator advance solenoid 1.

Solenoid 1 shifts pilot valve 80 to the right, closing the air supply at the right hand end of valve 80 and opening the left hand end of valve 80.

Opening the left hand end of valve 80 connects the right hand end of locator valve 81 with exhaust.

At the same time, the constant air pressure in the rod end of locator valve cylinder 82 shifts locator valve piston 83 to the right and connects the rod end of cylinder 82 with the head end of locator cylinder 90 to advance locator 91 to operative position.

At the same time, valve 81 connects the rod end of locator cylinder 90 to exhaust.

The advance of locator 91 actuates limit switch 4LS which completes a circuit through locator limit switch 3LS and normally closed relay contact 9CR1 to energize quill advance relay 6CR.

Relay contact 6CR2 completes a circuit to energize quill advance solenoid 2.

Solenoid 2 shifts the quill advance and retract valve 100 to the left to direct fluid under pressure to the rod end of quill advance cylinder 56 to start the movement of workpiece W toward grinding wheel 11.

At the same time, relay contact 6CR1 closes to complete a circuit through normally closed locator approach limit switch 5LS to energize quill advance slow down relay 7CR.

Relay contact 7CR1 energizes solenoid 3, shifting slow down valve 105 to the right, connecting cylinder 56 to the supply of fluid under pressure which by-passes slow down throttle valve 106, whereby to advance workpiece W rapidly toward grinding position.

Workpiece W engages locator 91 and opens locator approach limit switch 5LS to deenergize relay 7CR.

Solenoid 3 is deenergized and slow down valve 105 moves to the left connecting the supply of fluid under pressure so that it must first pass through slow down throttle valve 106.

Workpiece W continues to move to the right at a reduced rate until locator limit switch 3LS is actuated with the work on location, opening the circuit to quill advance relay 6CR, deenergizing quill advance solenoid 2, and stopping the advance movement of quill 51, and closing the circuit through normally closed work drive motor relay contact 14CR1 to energize timer relay 1TR.

Timer relay contact 1TR opens after a predetermined interval in the circuit to relay 2CR.

Relay contact 2CR2 opens to deenergize lateral locator advance solenoid 1.

Timer relay contact 1TR2 holds relay 1TR until locator 91 is retracted.

When solenoid 1 is deenergized, pilot valve 80 is shifted to the left and locator 91 is retracted, opening limit switch 4LS and the circuit to relay 6CR to deenergize quill advance solenoid 2.

Quill advance and retract valve 100 is centered and flow of fluid to cylinder 56 is stopped, holding quill 51 and the work in grinding position.

Grinding wheel 11 is advanced by closing wheel-in push button 115, closing relay 12CR.

Relay 12CR acts through a valve (not shown) to direct fluid under pressure to the head ends of rapid feed cylinder 12 and slow feed cylinder 36.

Normally closed relay contact 12CR1 is a holding circuit for relay 10CR.

Relay contact 12CR2 is a holding contact for relay 12CR.

Advancing wheel support 10 closes limit switch 7LS to start work drive motor relay 5MRT.

Normally closed contact 14CR1 opens as soon as the work drive motor (not shown) starts, to denergize and reset timer relay 1TR.

Holding relay contact 1TR1 is opened.

Lateral locator advance relay 2CR is deenergized.

Relay contact 2CR2 opens to deenergize solenoid 1 to retract locator 91.

Grinding wheel 11 is advanced by means of feed piston 35 and hand wheel shaft 19 to grind the flange and cylindrical portions of workpiece W simultaneously until slow down limit switch 9LS is actuated by cam 40 on hand wheel 30 to energize relay 37CR.

Contact 37CR2 closes to energize quill retract relay 9CR.

At the same time, relay contact 37CR4 closes to energize quill back-off solenoid 16.

Quill retract solenoid 4 shifts valve 100 to the right to connect quill back-off valve 110 with the head end of cylinder 56.

Solenoid 16 shifts valve 110 to the left, connecting the pressure line from valve 100 to the displacement cylinder 120 from which a measured amount of fluid is directed to the head end of cylinder 56.

Quill 51 and workpiece W are backed off just enough to separate the flange portion 20 of workpiece W from grinding wheel 11.

The grinding operation continues on the cylindrical portion 21 of workpiece W until a feed completion limit switch (not shown) is actuated by hand wheel 30 to stop the grinding operation. The grinding operation may also be stopped by a positive stop (not shown) in the path of feed piston 35 or some other element of the feed mechanism.

For the purpose of illustration, grinding wheel 11 is retracted by opening push button switch 116 to deenergize relay 12CR.

A contact (not shown) of relay 12CR operates to retract piston 13 and wheel support 10.

During the back-off movement, limit switch 9LS opens in preparation for the next grinding cycle.

At the end of the retract movement of wheel support 10, limit switch 7LS is opened to deenergize work drive motor relay 5MRT to stop the work drive motor (not shown).

Contact 12CR3 opens to deenergize relay 37CR.

Relay contact 37CR3 is a holding contact.

Relay contact 37CR4 opens to deenergize quill back-off solenoid 16 to change the connection of the head end of cylinder 56 from displacement cylinder 120 to the pressure line of the hydraulic system to valve 100.

Normally closed relay contact 37CR1 closes in the circuit with relay contact 9CR2 to energize relay 7CR and solenoid 3 to retract quill 51 at a rapid rate.

When relay contact 37CR2 opens in the circuit to relay 9CR, relay 9CR is held by relay contact 9CR3 and normally closed relay contact 10CR1.

When quill 51 is retracted, limit switch 6LS is closed to energize relay 10CR.

Contact 10CR2 and normally closed relay contact 12CR1 provide a holding circuit for relay 10CR.

Normally closed relay contact 10CR1 opens to deenergize relay 9CR.

Relay contact 9CR4 opens to deenergize quill retract solenoid 4 to cut off the fluid supply to cylinder 56.

The apparatus shown and described herein is primarily for the purpose of illustration. The invention is considered to include other means for separating the grinding wheel and the annular portion of the workpiece while continuing the grinding operation on the cylindrical portion of the workpiece.

I claim:

1. In a grinding machine for grinding adjacent annular and cylindrical portions of a workpiece, a headstock and a footstock, each having a center for engaging and rotatably supporting a workpiece, a grinding wheel, means for feeding said grinding wheel toward and from said workpiece, means to effect endwise movement of said centers and said workpiece relative to said grinding wheel including a piston and cylinder, and means operable after a predetermined feeding movement of said grinding wheel for directing a measured amount of fluid under pressure to said cylinder to reverse said endwise moving means, to separate said annular portion of said workpiece from said grinding wheel a predetermined amount.

2. In a grinding machine for grinding adjacent annular and cylindrical portions of a workpiece, a headstock and a footstock, each having a center for engaging and rotatably supporting a workpiece, a grinding wheel, means for feeding said grinding wheel toward and from said workpiece, means to effect endwise movement of said centers and said workpiece relative to said grinding wheel including a piston and cylinder, and means including a limit switch operable by said feeding means to reverse said endwise moving means a predetermined amount to separate said annular portion of said workpiece from said grinding wheel, but continuing the grinding operation on said cylindrical portion of said workpiece.

3. In a grinding machine for grinding adjacent annular and cylindrical portions of a workpiece, a headstock and a footstock, each having a center for engaging and rotatably supporting a workpiece, a grinding wheel and means for feeding said grinding wheel toward and from said workpiece, means to effect endwise movement of said centers and said workpiece relative to said grinding wheel, and means operable after a predetermined feeding movement of said grinding wheel to reverse said endwise moving means, to separate said annular portion of said workpiece from said grinding wheel by a predetermined amount while continuing the grinding operation on said cylindrical portion of said workpiece.

4. In a grinding machine for grinding adjacent annular and cylindrical portions of a workpiece, means for rotatably supporting a workpiece including a headstock, a grinding wheel and means for feeding said grinding wheel toward and from said workpiece, means to effect relative endwise movement between said grinding wheel and said workpiece, and means operable after a predetermined feeding movement of said grinding wheel to actuate said endwise moving means to separate said grinding wheel and said annular portion of said workpiece while continuing the grinding operation on said cylindrical portion of said workpiece.

References Cited in the file of this patent

UNITED STATES PATENTS 3,064,395    Price _____ Nov. 20, 1962